J. S. McMURRAY.
BUCKET-EAR.

No. 184,016.  Patented Nov. 7, 1876.

Witnesses.

Inventor:

UNITED STATES PATENT OFFICE.

JAMES S. McMURRAY, OF TORONTO, ONTARIO, CANADA.

IMPROVEMENT IN BUCKET-EARS.

Specification forming part of Letters Patent No. 184,016, dated November 7, 1876; application filed August 15, 1876.

*To all whom it may concern:*

Be it known that I, JAMES SAURIN MC-MURRAY, of the city of Toronto, in the county of York and Province of Ontario, Canada, merchant, have invented certain new and useful Improvements in Pails and Tubs; and I do hereby declare that the following is a full, clear, and exact description of the same.

My invention relates to an improvement in the construction and mode of attaching the bails of pails and tubs; and consists more particularly of a peculiarly-formed ear made from sheet tin, brass, or other suitable material, to which the bail is attached, as hereafter described.

Figure 1:
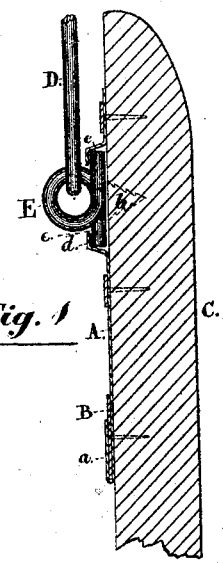
Figure 2:
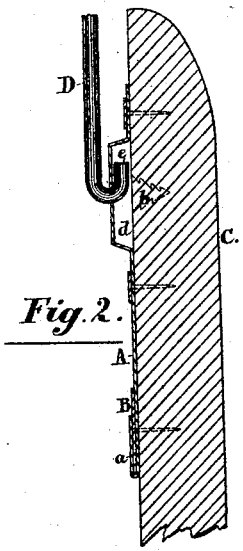
Figure 3:
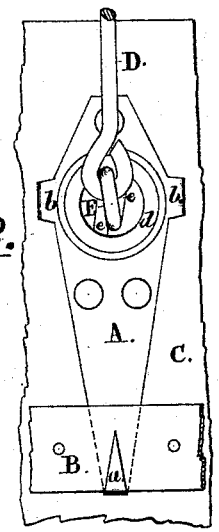
Figure 4:
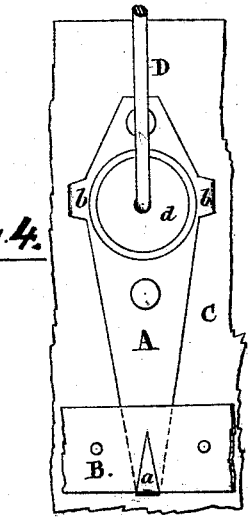

Figs. 1 and 2 are sectional views. Figs. 3 and 4 are front views.

A is a pail-ear made of sheet brass, tin, or other suitable material, preferably fish-shaped, as shown in Figs. 3 and 4, the tail $a$ passing beneath and clinched around the first hoop, B, the fins $b\ b$ being bent and driven into the wood-work $c$ of the pail, and the said ear A may be further secured by screws or nails. In stamping out this plate A a button-shaped projection, $d$, is found, as shown, with a round hole in its center. Owing to this projection $d$ a space or chamber is left between the wood-work $c$ and the face of the plate A, within which space the wire connecting the bail D to the ear A has room to swivel, entering thereon through the hole in the button-shaped projection $d$, as shown.

As the main object of my invention is to connect the bail D to the ear A, and the ear to the pail C, that they shall not easily be separated, I consider that the double bearing upon the inside of the button $d$, secured by the form of the eye E, is very important—that is to say, the ends $e\ e$ of the wire forming this eye make an easy-working swivel-joint, which cannot readily be broken, and the eye connection between the bail D and eye E is equally secure.

Figs. 2 and 4 suggest a slightly-different form of ear, A, and a way in which the bail D can be connected direct to the ear A.

What I claim as my invention is—

1. A sheet-metal ear, A, formed with a button-shaped projection, $d$, and clinching-pieces $a$ and $b\ b$, in combination with the hoop B, as specified.

2. The eye E, having ends $e\ e$ fitting and working within the space formed by the button-shaped projection $d$, in combination with the bail D, as specified.

Toronto, July 28th, 1876.

J. SAURIN McMURRAY.

Signed in the presence of—
DONALD C. RIDOUT,
RICHARD E. HEWAT.